Aug. 9, 1938.  D. E. SHARP  2,126,351

APPARATUS FOR FEEDING CHARGES OF MOLTEN GLASS

Filed Feb. 27, 1936

INVENTOR.
Donald E. Sharp,
BY
his ATTORNEYS.

Patented Aug. 9, 1938

2,126,351

UNITED STATES PATENT OFFICE 2,126,351

APPARATUS FOR FEEDING CHARGES OF MOLTEN GLASS

Donald E. Sharp, Hamburg, N. Y.

Application February 27, 1936, Serial No. 66,111

25 Claims. (Cl. 49—55)

The present invention relates to apparatus for forming gobs or charges of molten glass suitable for use with forming machines in which the glass is made into articles of commerce such as bottles, dishes and the like, and the invention aims generally to improve existing feeding devices for that purpose.

As is well known, molten glass is a viscous liquid and will flow by gravity from any opening in the bottom of a chamber containing it. The flow will be continuous and because of this it is difficult to sever the stream into individual gobs having a desired shape. To aid in the severance it is necessary to change the stream from a steady flow to one consisting of pulsations, whereby considerably more glass than would issue in the same time by gravity alone is forced out of the orifice during one part of the cycle and then to retard the flow or even draw some of the glass back into the orifice during or immediately after the severing of the stream. This type of flow has been accomplished in the past by reciprocating refractory parts operating on the surface of the glass or by the application of negative or positive pressure thereon through the agency of pneumatic means, or by a piston or plunger type of device acting in a well.

All of these methods have certain disadvantages which are overcome in my invention as will be more fully described hereinafter.

In my apparatus all of the motions are rotary in nature thereby reducing the shocks and vibration. Further, the mass of clay or refractory acting below the glass surface is constant since no reciprocating motion is employed and therefore erosion of the clay parts is reduced.

In order that the principles of the invention may be understood, I have illustrated in the accompanying drawing one form of apparatus suitable for practising the invention.

Figure 1:
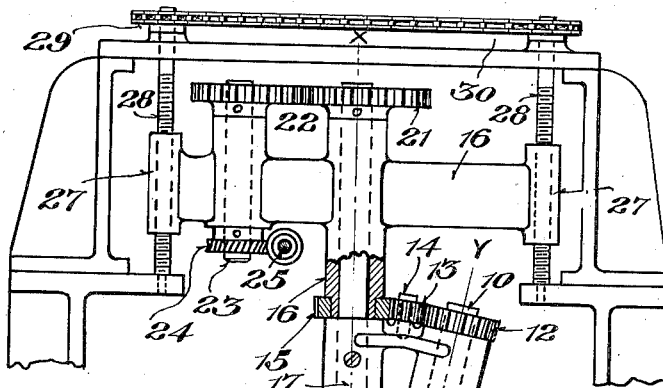
Fig. 1 is a longitudinal sectional view of a preferred embodiment of the invention.

In the art of automatically feeding or delivering charges or gobs of molten glass to forming machines, the glass is conveniently melted in a tank (not shown) from which it flows to fore bays or forehearths equipped with a feeding device. The forehearth usually consists of a refractory bowl 1 adequately supported within a metal housing 2. The bowl 1 and housing 2 contact at sufficient places to insure a proper functioning of the apparatus, but to a considerable extent, a space is provided between the two which is filled with a suitable heat insulating material 3. Customarily the bowl 1 is provided with a submerged outlet 5 in its bottom, and as is usual, the effective size of this opening may be altered as desired, in accordance with the desired amount of glass flowing through the opening.

The molten glass is continuously supplied to the bowl 1 from the tank or other source of molten glass, and consequently the level of the glass 4 in the bowl remains substantially constant and unchanged throughout any working period, whether or not glass is flowing through the opening 5. A separate refractory ring or orifice 6 may be provided below and aligned with the opening 5 and shears 7 are normally provided immediately below the orifice 6 adapted suitably to be operated in synchronism with the desired period of pulsations of the glass within the bowl 1.

The discharge of molten glass through the opening 5 and orifice 6 in a pulsating stream is advantageously accomplished, according to the present invention, by means of an impeller mounted in the bowl 1 and submerged in the glass, which impeller has imparted to it an oscillatory or wabbling motion such that portions of the impeller immediately above the opening 5 are alternately moved toward and from said opening to alternately apply a positive and negative pressure on the glass within the bowl and adjacent said opening. This advantageously may be accomplished by the mechanism illustrated in the accompanying drawing, which is simple in construction and operation, yet is susceptible of wide variations of control to suit varying conditions of operation.

According to the illustrated construction, an impeller having an enlarged head or disc 8 and a shank 8ª, preferably made of suitable refractory material, is mounted in the bowl 1 with the head or disc 8 lowermost and submerged in the glass. The shank of the impeller is mounted in a suitable clamp 9, formed on the lower end of a shaft 10, rotatably mounted in a crank bearing 11. The shaft 10 and impeller are therefore rotatable about the inclined axis Y—Y. A gear 12 is fastened to the upper end of the shaft 10 and meshes with an idle gear 13 rotatable around a post 14, carried by the crank bearing 11, the gear 13 also meshing with a stationary gear 15 fixedly secured to a stationary support, as for example, the casting 16.

The casting 16 preferably is hollow and has a shaft 17 rotatably mounted therein which shaft is free to rotate about the axis X—X. The lower end of the shaft 17 carries a cover block or guide ring 18, having an eccentric opening 19 embracing the impeller shank 9 and advantageously the ring 18 is connected to the shaft 17 by means of a crank or other suitable connection 20. Preferably the ring 18 is made of refractory material, as shown, but obviously it may be partly of metal, as it is not submerged in the molten glass. Preferably one branch of the bearing is pinned to the shaft 17 so that rotation of the shaft causes a gyratory movement of the impeller.

The axis X—X of the shaft 17 and guide ring 18 and the inclined axis Y—Y of the impeller and shaft 10 are such that they intersect, preferably at or adjacent a point centrally of the lower face of the impeller. These axes are advantageously along a longitudinal section of the bowl taken through the opening 5, and are eccentric of said opening 5, preferably so that an edge portion of the impeller disc 8 is immediately above the opening 5.

From the above it will be apparent that as the shaft 17 is rotated, the crank bearing 11 also will be rotated about the axis X—X carrying with it the impeller. The axis of the impeller will describe a conical path around the axis X—X of the shaft 17, and the bottom face of the impeller will rock back and forth in a gyratory manner, about the intersection point of the axes X—X, Y—Y, thus simulating an oscillatory movement above the opening 5, and thus alternately applying a positive and negative pressure on the glass immediately above the opening 5.

As will be apparent the gears 12 and 13, moving around the stationary gear 15, constitute a planetary gear train, and the gear 12 rotates in the opposite direction to the rotation of the shaft 17. The rotation of the gear 12 and impeller relative to the rotation of the shaft 17 depends upon the relative number of teeth of the gears 12 and 15. If gears 12 and 15 have the same number of teeth, no rotation will be imparted to the shaft 10 and impeller relative to its movement about the axis X—X and the impeller will only have the oscillatory or gyratory movement. The front side of the impeller will, therefore, always remain toward the front of the bowl and agitation of the glass will be reduced to a minimum. I have found, however, in certain cases that a slight residual rotation of the impeller is beneficial and I accomplish this by slightly increasing or decreasing the number of teeth of the gear 12 as compared with the gear 15.

Figure 4:
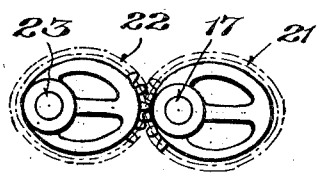
Fig. 4 is a plan view of one form of driving gears that may be used to advantage.

The shaft 17 is preferably driven at a constant speed i. e. R. P. M., and this may be accomplished by any desired means, advantageously by a gear 21 secured to the upper end of the shaft 17 and meshing with a companion gear 22 on a shaft 23 rotatably mounted in the housing 16 and conveniently rotated by suitable worm gearing 24 from a constant speed shaft 25. These gears 21 and 22 may be ordinary circular spur gears, if it is desired to drive the shaft 17 at a uniform rotative speed. I have found, however, that better results are obtained if the shaft 17 has a varying rotative speed during its revolution and this may be accomplished by making the gears in the form of elliptical gears as shown in Fig. 4. It is to be understood, however, that any type of gear giving either a uniform or non-uniform rotative speed may be employed which gives the best practical results in the formation of the particular shape of the gob desired, the only limitation being that the cycle of rotative speeds imparted to the shaft 17 shall be repeated exactly for each revolution of said shaft.

If the shaft 25 is driven at a constant speed, the shaft 17 will also be driven at a definite number of revolutions per minute although it may vary during the revolutions in its angular velocity. Since the crank bearing 11 is driven by the shaft 17 it is evident that the axis Y—Y of the impeller will describe a conical path around the axis X—X. The bottom face of the impeller will rock back and forth in a gyratory manner about the intersection of the axes X—X, Y—Y. The slight rotation imparted to the impeller around the axis Y—Y prevents undesirable circulation and agitation of the glass within the bowl which would be experienced if the gears 12, 13 and 15 were dispensed with.

It will now be evident that during half of the revolutions of the impeller, the volume of glass below the impeller at the region marked 26 is undergoing diminution, while during the other half of the revolution it is increasing. Inasmuch as the glass is a viscous liquid it cannot readily follow these changes in volume and hence they are accompanied by positive and negative waves of pressure which cause the desired pulsation in the issuing stream of glass from the orifice in the bottom of the bowl. Since these waves of pressure depend upon the ease with which the trapped glass can escape, I can variably control them by changing the effect of the impeller upon the glass in the issuing stream, as by raising or lowering the impeller with respect to the bottom of the bowl and the opening 5. This may advantageously be accomplished in the following manner.

The casting 16 may be provided with threaded lugs 27 receiving screws 28. Each of these screws 28 may be formed with sprockets 29 connected by means of a chain 30. One of the screws 28 may advantageously be turned manually by means of a handle (not shown) and when so operated, the casting 16 will be raised or lowered to raise and lower the impeller as well as the driving mechanism therefor.

Figure 3:
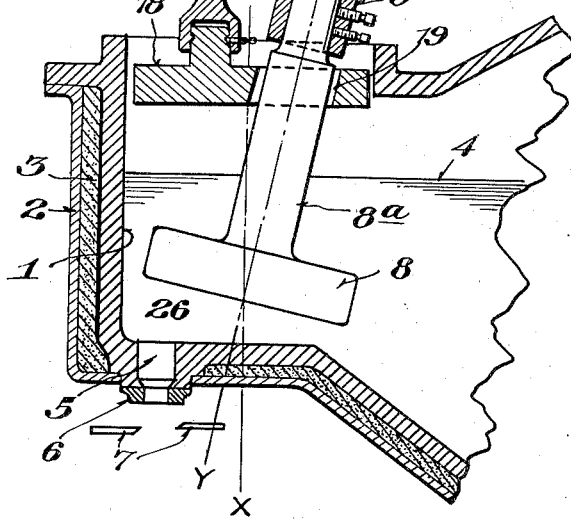
Fig. 3 is a plan view thereof.
Figure 2:
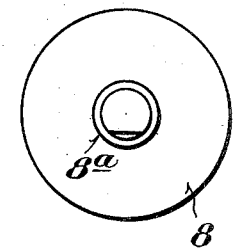
Fig. 2 is a detail elevation of the impeller.
Figure 2:
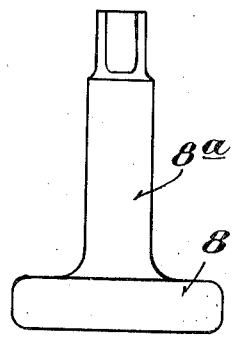

The impeller may advantageously be in the form shown in Figs. 2 and 3 in which all sections are surfaces of revolution about the axis of the impeller. While this is the preferred form of the impeller, I have found that many other forms having conical sections or having elliptical sections in lieu of circular sections are workable. Thus the bowl may have a narrow width but be longer from front to back and the disc of the impeller may be shaped to conform with the plan section of the bowl, the proper clearances of course, being allowed.

It is evident that the magnitude of impeller action upon the glass depends upon the angle between the axes X—X and Y—Y, provided the size of the parts or their relation to the sides and bottom of the bowl is otherwise unaltered. While it is possible to provide a mechanism whereby the relative angle could be altered at will, within the scope of the invention, I have found that the alteration of this angle is usually unnecessary and that when the size of the gob is such that it is desirable to change the angle, this can be more easily accomplished by supplying a differently shaped crank and bearing 11 with the coacting gears 12, 13 and 15, these parts being replaceable with relative ease.

Advantages of the invention will be apparent to those skilled in the art. By reason of the invention the alternate positive and negative waves of pressure may be applied to the glass in the bowl immediately above the opening 5 by rotation of the impeller, thus to cause the issuing of the stream of glass from the orifice in a condition that it may be adequately severed into gobs and may advantageously be used in modern forming machines. Because the movements of the impeller and mechanism are all movements of rotation, the apparatus is simpler of construction and operation than others heretofore used. Furthermore, because the movements of the impeller are imparted by movements of rotation, a higher speed of gob discharge from the bowl may be effected than in the case of reciprocatory movements of the impeller. As will be apparent, the apparatus is susceptible of a wide range of adjustment and speeds so that a wide range of variably shaped gobs may be formed and delivered.

Obviously the invention is not restricted to the details of construction illustrated and described which are intended for illustrative purposes only and the invention contemplates other forms of apparatus within the scope of the appended claims.

I claim:

1. Glass feeding apparatus comprising a bowl formed with a submerged outlet therein for containing a supply of molten glass, and an impeller within said bowl, and means for wabbling said impeller in a circulatory manner about a point located substantially centrally thereof to apply alternately an increasing and diminishing pressure upon the glass above the outlet to force said glass from said outlet in a pulsating stream.

2. Glass feeding apparatus comprising a bowl formed with a submerged outlet therein for containing a supply of molten glass, and an impeller within said bowl, and means for moving said impeller in a gyratory path to apply alternately an increasing and diminishing pressure upon the glass above the outlet to force said glass from said outlet in a pulsating stream.

3. Glass feeding apparatus comprising a bowl formed with a submerged outlet therein for containing a supply of molten glass, a disc shaped impeller within said bowl and submerged in said glass, means for mounting said impeller on an axis inclined with respect to said outlet, and means for moving said impeller bodily in a continuous circulatory manner in a gyratory path to apply alternately an increasing and diminishing pressure upon the glass above the outlet to force said glass from said outlet in a pulsating stream.

4. Glass feeding apparatus comprising a bowl formed with a submerged outlet therein for containing a supply of molten glass, a disc shaped impeller within said bowl and submerged in said glass, means for mounting said impeller on an axis inclined with respect to said outlet, and means for moving said impeller bodily in an inverted conical path to apply alternately an increasing and diminishing pressure upon the glass above the outlet to force said glass from said outlet in a pulsating stream.

5. Glass feeding apparatus comprising a bowl formed with a submerged outlet therein for containing a supply of molten glass, a disc shaped impeller within said bowl and submerged in said glass, means for mounting said impeller on an axis inclined with respect to said outlet, means for moving said impeller bodily in an inverted conical path to apply alternately an increasing and diminishing pressure upon the glass above the outlet to force said glass from said outlet in a pulsating stream, and means for rotating said impeller about its inclined axis.

6. Glass feeding apparatus, in combination with a bowl for containing a supply of molten glass and having a submerged outlet therein, of means for forcing molten glass through said outlet in a pulsating stream comprising a disc shaped impeller mounted within said bowl with its axis inclined with respect to the axis of said outlet, and means for moving said impeller bodily about an axis substantially parallel to the axis of said outlet.

7. Glass feeding apparatus, in combination with a bowl for containing a supply of molten glass and having a submerged outlet therein, of means for forcing molten glass through said outlet in a pulsating stream comprising a disc shaped impeller mounted within said bowl with its axis inclined with respect to the axis of said outlet, and means for rotating said impeller about a vertical axis, eccentric to the axis of said outlet.

8. Glass feeding apparatus, in combination with a bowl for containing a supply of molten glass and having a submerged outlet therein, of means for forcing molten glass through said outlet in a pulsating stream comprising a disc shaped impeller mounted within said bowl with its axis inclined with respect to the axis of said outlet, and means for rotating said impeller about a vertical axis intersecting said inclined axis substantially centrally of the lower face of the impeller and eccentric to the axis of said outlet.

9. Glass feeding apparatus, in combination with a bowl for containing a supply of molten glass and having a submerged outlet therein, of means for forcing molten glass through said outlet in a pulsating stream comprising a disc shaped impeller mounted within said bowl with its axis inclined with respect to the axis of said outlet, means for moving said impeller bodily about an axis angularly disposed with reference to its own axis, and means for rotating said impeller about its own axis.

10. An apparatus for feeding charges of molten glass comprising in combination a receptacle containing a supply of molten glass and having a discharge outlet in the bottom thereof, a disc shaped impeller mounted in said receptacle and spaced from said orifice, and means for actuating said impeller to cause the surface thereof to be moved in a gyratory manner to progressively change the angular relation between said impeller surface and the bottom of the receptacle, thereby alternately increasing and diminishing pressure upon the glass above the outlet.

11. Glass feeding apparatus, in combination with a bowl for containing a supply of molten glass and having a submerged outlet therein, of means for forcing molten glass through said outlet in a pulsating stream comprising a disc shaped impeller mounted within said bowl with its axis inclined with respect to the axis of said outlet, and means for moving said impeller bodily at varying angular velocities about an axis substantially parallel to the axes of said outlet.

12. Glass feeding apparatus, in combination with a bowl for containing a supply of molten glass and having a submerged outlet therein, of means for forcing molten glass through said outlet in a pulsating stream comprising a disc shaped impeller mounted within said bowl with its axis inclined with respect to the axis of said outlet, means for rotating said impeller bodily about an axis angularly disposed with reference to its own axis, and means for variably controlling the position of said impeller with reference to said outlet.

13. Glass feeding apparatus, in combination with a bowl for containing a supply of molten glass and having a submerged outlet therein, of means for forcing molten glass through said outlet in a pulsating stream comprising a disc shaped impeller mounted within said bowl with its axis inclined with respect to the axis of said outlet, and means for moving said impeller bodily about an axis angularly disposed with reference to its own axis, and a planetary gear train for rotating said impeller about its inclined axis.

14. Glass feeding apparatus, in combination with a bowl for containing a supply of molten glass and having a submerged outlet therein, of means for forcing molten glass through said outlet in a pulsating stream comprising a disc shaped impeller mounted within said bowl with its axis inclined with respect to the axis of said outlet, means for moving said impeller bodily about an axis angularly disposed with reference to its own axis, and a rotating cover member for said bowl secured to said impeller moving means.

15. Glass feeding apparatus, in combination with a bowl for containing a supply of molten glass and having a submerged outlet therein, of means for forcing molten glass through said outlet in a pulsating stream comprising a disc shaped impeller mounted within said bowl with its axis inclined with respect to the axis of said outlet, and means for imparting to said impeller a circular motion about an axis angular to said inclined axis and intersecting the latter within the impeller to cause the impeller to move above said outlet.

16. Glass feeding apparatus, in combination with a bowl for containing a supply of molten glass and having a submerged outlet therein, of means for forcing molten glass through said outlet in a pulsating stream comprising a disc shaped impeller mounted within said bowl with its axis inclined with respect to the axis of said outlet, and means for rotating said impeller bodily about an axis angular to said inclined axis and intersecting the latter substantially centrally of the bottom face of the impeller to impart a wabbling motion to said impeller disc above said opening.

17. Glass feeding apparatus, in combination with a bowl for containing a supply of molten glass and having a submerged outlet therein, of means for forcing molten glass through said outlet in a pulsating stream comprising a disc shaped impeller mounted within said bowl with its axis inclined with respect to the axis of said outlet, and means for rotating said impeller at varying angular velocities bodily about an axis angular to said inclined axis and intersecting the latter substantially centrally of the bottom face of the impeller to impart a wabbling motion to said impeller disc above said opening.

18. Glass feeding apparatus comprising a bowl for containing a supply of molten glass and provided with a submerged outlet through which the glass is delivered, a shaft above the bowl rotatable about an axis eccentric to the axis of the outlet, a crank connected to the shaft and formed with a bearing portion eccentric of, and inclined with respect to the axis of the shaft, a disk shaped impeller connected to said bearing and formed with a portion overlying said outlet, and means for rotating said shaft to cause said impeller to be moved bodily about said eccentric axis and in a gyratory manner above and around said outlet.

19. Glass feeding apparatus comprising a bowl for containing a supply of molten glass and provided with a submerged outlet through which the glass is delivered, a shaft above the bowl rotatable about an axis eccentric to the axis of the outlet, a crank connected to the shaft and formed with a bearing portion eccentric of and inclined with respect to the axis of the shaft, an impeller connected to said bearing and formed with a portion overlying said outlet, means for rotating said shaft to cause said impeller to be moved bodily about said eccentric axis, and means for rotating said impeller about its own inclined axis.

20. Glass feeding apparatus comprising a bowl for containing a supply of molten glass and provided with a submerged outlet through which the glass is delivered, a shaft above the bowl rotatable about an axis eccentric to the axis of the outlet, a crank connected to the shaft and formed with a bearing portion eccentric of and inclined with respect to the axis of the shaft, an impeller connected to said bearing and formed with a portion overlying said outlet, and means for rotating said shaft to cause said impeller to be moved bodily about said eccentric axis, said rotating means including an elliptical gear drive whereby a varying rotative speed is imparted to said shaft.

21. Glass feeding apparatus comprising a bowl formed with a submerged outlet therein for containing a supply of molten glass, a disc shaped impeller within said bowl and submerged in said glass, means for mounting said impeller on an axis inclined with respect to said outlet, means for moving said impeller bodily in an inverted conical path to apply alternately an increasing and diminishing pressure upon the glass above the outlet to force said glass from said outlet in a pulsating stream, and means for adjustably raising or lowering the impeller with respect to the orifice to variably control the effect of the impeller upon the glass.

22. Glass feeding apparatus comprising a bowl containing a supply of molten glass and formed with a submerged outlet, a disc-shaped impeller within said bowl, a rotating shaft above said bowl, a crank connected to said shaft and formed with a bearing eccentric of and inclined with respect to said shaft, means connecting said impeller to said bearing, and means for rotating said shaft.

23. Glass feeding apparatus comprising a bowl containing a supply of molten glass and formed with a submerged outlet, a disc-shaped impeller within said bowl, a rotary shaft above said bowl, a crank connected to said shaft and formed with a bearing eccentric of and inclined with respect to said shaft, means for adjusting the shaft and crank vertically with respect to the bowl, means connecting said impeller to said bearing, and means for rotating said shaft.

24. Glass feeding apparatus comprising a bowl containing a supply of molten glass and formed with a submerged outlet, a disc-shaped impeller within said bowl, a rotary shaft above said bowl and rotatable about an axis eccentric to but parallel to the axis of said outlet, a crank connected to said shaft and formed with a bearing eccentric of and inclined with respect to said shaft, means connecting said impeller to said bearing, and means for rotating said shaft.

25. Glass feeding apparatus comprising a bowl containing a supply of molten glass and formed with a submerged outlet, a disc-shaped impeller within said bowl, a rotating shaft above said bowl, a crank connected to said shaft and formed with a bearing eccentric of and inclined with respect to said shaft, means connecting said impeller to said bearing, and means for rotating said shaft at a varying rotative speed.

DONALD E. SHARP.